United States Patent [19]

Mumcu et al.

[11] Patent Number: 4,711,925

[45] Date of Patent: Dec. 8, 1987

[54] PROCESS FOR PREPARING POLYAMIDE-BASED, PULVERULENT COATING COMPOSITIONS FOR HIGH MOLECULAR WEIGHT POST CONDENSATION, EMPLOYING THE PRECIPITATION PROCEDURE

[75] Inventors: Salih Mumcu, Marl; Hans J. Panoch, Haltern; Joern Rueter, Marl, all of Fed. Rep. of Germany

[73] Assignee: Hüls Aktiengesellschaft, Marl, Fed. Rep. of Germany

[21] Appl. No.: 840,792

[22] Filed: Mar. 18, 1986

[30] Foreign Application Priority Data

Mar. 23, 1985 [DE] Fed. Rep. of Germany ....... 3510690

[51] Int. Cl.$^4$ .............................................. C08G 69/46
[52] U.S. Cl. .................... 524/417; 524/379; 524/606; 528/487; 528/496
[58] Field of Search ...................... 524/417, 379, 606; 528/496, 487

[56] References Cited

U.S. PATENT DOCUMENTS 4,273,919  6/1981  Feldmann et al. .................. 528/496
4,334,056  6/1982  Meyer et al. ........................ 528/323

Primary Examiner—Harold D. Anderson
Attorney, Agent, or Firm—Quaintance, Murphy & Presta

[57] ABSTRACT

A precipitation procedure for preparing pulverulent coating compositions of high molecular weights by post condensation and based on polyamides having at least ten aliphatically bound carbon atoms per carbonamide group. The starting materials are uncontrolled polyamides having a relative solution viscosity of between 1.7 and 2.0 (measured in 0.5% meta cresol solution at 25° C.) and contain not more than 0.2% by weight of phosphoric acid. After the cooling stage of the precipitation step of the polyamides, from 0.3 to 1.2% by weight of phosphoric acid referred to the polyamide are dispersed in the suspension prior to the precipitation in the solution or after the precipitation stage.

12 Claims, No Drawings

PROCESS FOR PREPARING POLYAMIDE-BASED, PULVERULENT COATING COMPOSITIONS FOR HIGH MOLECULAR WEIGHT POST CONDENSATION, EMPLOYING THE PRECIPITATION PROCEDURE

CROSS-REFERENCE TO RELATED APPLICATIONS

Applicants claim priority under 35 USC 119 for application No. P 35 10 690.5, filed Mar. 23, 1985, in the Patent Office of the Federal Republic of Germany.

The disclosure of copending application Ser. No. 840,819 filed Mar. 18, 1986 of MUMCU ET AL entitled PROCESS FOR PREPARING PULVERULENT COATING COMPOSITIONS BASED UPON POLYAMIDES HAVING AT LEAST TEN ALIPHATICALLY BOUND CARBON ATOMS PER CARBONAMIDE GROUP is incorporated herein to show an improved precipitation procedure useful in the present invention.

BACKGROUND OF THE INVENTION

The field of the present invention is polyamide powders for the coating of metals.

The invention is particularly concerned with methods for the production of pulverulent coating compositions for high molecular weight post condensation and based on polyamides having at least ten aliphatically bound carbon atoms per carbonamide group or copolyamides or a mixture of homopolyamides and copolyamides containing at least 70% of the stated components while employing the precipitation procedure.

The state of the prior art of producing polyamide powders may be ascertained by reference to U.S. Pat. Nos. 3,476,711; 3,900,607; 3,927,141; 3,966,838; 4,143,025; 4,195,162; 4,273,919; and 4,334,056; British Pat. Nos. 535,138; 688,771; and 1,392,949; and the Kirk-Othmer "Encyclopedia of Chemical Technology", 2nd Ed., Vol. 16 (1968), under the section "Polyamide (Plastics)", pages 88–105 particularly page 92 - polylauryllactam (nylon-12), and polyundecanamide (nylon-11), page 101 Solution Processes, and Power Processing, pages 101–102, the disclosures of which are incorporated herein by reference.

The flame spraying and fluidized bed coating of nylon on a metal base is disclosed in U.S. Pat. No. 3,203,822.

The use of polyamide based pulverulent coating compositions to prepare varnish type coatings for metals is known. The coating is implemented by the melt film method, that is, by fluidized bed, flame-spraying or electrostatic coating. The polyamide powders are obtained by precipitating the polyamide from solutions as disclosed in British Pat. No. 688,771, or by grinding the polyamide granulate, preferably at low temperatures in an inert gas atmosphere as in U.S. Pat. No. 4,273,919.

The precipitation procedure of British Pat. No. 688,771 comprises the precipitation of polyamide powders from ethanol by cooling the hot polyamide solution by active external means or by merely letting it stand. It is only by active cooling or cooling by standing of the hot polyamide solution that powders with a high portion of fine particles are obtained and these fine particles result in dust generation in the fluidized bed.

Pulverulent polyamides of high molecular weights are desirable as coating compositions in the light of their high toughness, especially where large metal parts are coated, in particular parts with sharp edges, generally speaking molded parts which are shaped to have very small radii of curvature.

Post condensation of the coating compositions takes place during coating. This requires that there be adequate amounts of an acid catalyst such as phosphoric acid in the polyamide powder.

Conventionally the coating powders of high molecular weights prepared by the known precipitation procedure contain from 0 to 0.2% by weight of phosphoric acid. However, this phosphoric acid concentration is too low to achieve an adequate rate of polycondensation for the post condensation during the coating procedure. Even when uncontrolled polyamides with equimolar amino and carboxyl end groups are used, the coatings cannot be sufficiently post condensed.

It is true that one may start with polyamides having higher molecular weights, that is, with those having a $\eta_{rel}$ (relative viscosity) = 1.7, which contain adequate proportions of phosphoric acid, namely at least 0.4% by weight. However, when powders are prepared by the precipitation procedure and are based upon such polyamides, these polyamides are so decayed during dissolution and precipitation that powders made in this manner in spite of their post condensation are unsuitable as coating powders for thick walled metal parts because an inadequate coating on the edges results.

Accordingly, such powders to date have been conventionally prepared by the cold grinding method, that is, by the method of U.S. Pat. No. 4,273,919.

However, coating powders prepared by the grinding method incur a disadvantageous grain size distribution and their manufacture entails an additional and high cost grading procedure.

Lastly, such a method incurs undesired agglomerations which subsequently must be reduced by abrasion or grinding into the required powder size. Moreover, such a precipitation method results in non-reproducible, that is, differing batches which have a variation in particle size, molecular weight and bulk density.

It is further known to prepare polyamide powders by grinding polyamides of low molecular weights and then inducing in them the desired viscosity by heating them to temperatures below the melting point as disclosed in British Pat. No. 535,138 and U.S. Pat. No. 3,476,711.

Polylauryllactam powders also are prepared by this method and again are used in coating by procedures as disclosed in Chem. Ind. Nov. 1968, pp 783–791, and Modern Plastics, Feb. 1966, pp 153–156. Because polylauryllactam powders do not always meet the requirements of high elasticity, good edge coating, smooth surface, resistance to aqueous alkaline solutions, and often generate thick smoke in processing, the most diverse improvements have become known, such as polylauryllactam powders containing plasticizers as disclosed in U.S. Pat. No. 3,900,607, or those from a mixture of homopolylauryllactam copolyamides containing lauryllactam as disclosed in British Pat. No. 1,392,949, or those containing polyamides with N-alkoxymethyl groups besides acidically reacting catalysts as disclosed in U.S. Pat. No. 3,966,838, or mixtures of polyamides having 8 to 11 aliphatically bound carbon atoms per carbonamide group, aminoplasts bearing alkoxyalkyl groups and acidically reacting catalysts as disclosed in U.S. Pat. No. 3,927,141. In specific instances these powders exhibit good properties but they do not fully meet all requirements.

U.S. Pat. Nos. 4,143,025 and 4,195,162 describe an improved powder procedure. This procedure still fails to be fully satisfactory because the preparation of pigment free powders employs grinding and the preparation of pigmented powders entails precipitation. Lastly, success of this procedure presumes the use of polylauryllactam granulates prepared exclusively by hydrolytic polymerization in the presence of specified amounts of phosphoric acid.

U.S. Pat. No. 4,334,056 discloses a substantially improved procedure comprising a method of producing polyamide powder from polyamide having a relative viscosity of 1.4 to 1.8 as measured in 0.5% meta-cresol solution at 25° C. and at least 70% of said polyamide consisting of polyamide with at least ten aliphatically bound carbon atoms per carbonamide group, comprising:

(a) dissolving said polyamide in at least twice the amount by weight of ethanol in a closed vessel at a temperature between about 130° to 150° C. to form a solution of said polyamide;

(b) cooling said solution to a precipitation temperature between about 100° and 125° C. and ceasing said cooling at said precipitation temperature;

(c) precipitating said polyamide powder from said cooled solution of (b) polytropically with agitation and under an inert gas atmosphere; and (d) separating said precipitated polyamide powders of (c) from said ethanol.

SUMMARY OF THE INVENTION

Having in mind the limitations of the prior art it is an object of the present invention to provide a process allowing the preparation of coating powders by the precipitation procedure which can be post condensed during coating into coatings of high molecular weights and which, aside from the known good coating properties, are especially well suited to coat large molded parts with sharp corners and edges.

The objects of the present invention are achieved by a process for preparing pulverulent coating compositions for high molecular weight post condensations and based on polyamides having at least ten aliphatically bound carbon atoms per carbonamide group or a mixture of homopolyamides and copolyamides containing at least 70% of the stated components while employing the precipitation procedure.

The process is begun with uncontrolled polyamides (i.e. polyamides, manufactured without molecular weight regulators) having a relative solution viscosity betweeb 1.7 and 2.0 as measured in 0.5% m-cresol solution at 25° C. and containing from 0 to 0.2% by weight of phosphoric acid. From 0.3 to 1.2% by weight of phosphoric acid, referred to the polyamide, are dispersed in the suspension after dissolution of the polyamides and before the precipitation in the solution or after the precipitation stage.

DESCRIPTION OF THE PREFERRED EMBODIMENTS

Applicable polyamides for the process are polyamide 11, polyamide 12, and polyamides having more than 12 aliphatically bound carbon atoms per carbonamide group, preferably polyamide 12. Furthermore, the corresponding copolyamides or mixtures of homopolyamides and copolyamides can be used which contain at least 70% by weight of the polyamides having more than 12 carbon atoms. Accordingly, the comonomers they contain may be from 0 to 30% by weight of one or more comonomers such as caprolactam, hexamethylenediamine, 2-methylpentanediamine-(1,5), octamethylenediamine-(1,8), dodecamethylenediamine, isophoronediamine, trimethylhexamethylenediamine, adipic acid, suberic acid, azelaic acid, sebacic acid, dodecanoic diacid, or aminoundecanoic acid. The homopolyamides and copolyamides designed below as polyamides are used in the form of granulates or scrap having a relative solution viscosity between 1.7 and 2.0 as measured in 0.5% m-cresol solution at 25° C. according to German Industrial Standard DIN 53 727. Preferably, the viscosity is between 1.75 and 1.95. The polyamides can be produced by polycondensation, hydrolytic or acidolytic or activated anionic polymerization by known prior art procedures. Preferably uncontrolled polyamides having an end group ratio of $NH_2$ groups: COOH groups=40/60 to 60/40 are used. The polyamides used as starting materials contain at most 0.2% by weight of $H_3PO_4$. Preferably a polyamide free of $H_3PO_4$ is used.

The amount of phosphoric acid added is 0.3 to 1.2 and especially 0.4 to 1.0% by weight referred to the polyamide. It is added during the cooling stage of the polyamide solution, before precipitation, preferably, however, following precipitation, and with active stirring.

The process is applied especially advantageously employing the procedure described in the improvement of U.S. patent application Ser. No. 840,819 of Mumcu et al.

This procedure of application Ser. No. 840,819 is described again below:

The polyamide in ethanol solution produced at 140 to 150° C. is cooled at the rate of at least 10° C./hour while distilling ethanol rapidly until the saturation limit (about 125° C.) is reached. The jacket temperature during the ensuing further cooling stage until precipitation is set in the range between 90° and 113° C. with further distillation of ethanol, in such a manner that it is kept in step with the solution temperature closely enough that the jacket temperature at most shall be 3° C. less than the inside temperature and, lastly, the solution is kept in an isothermal state during the ensuing stage of precipitation by further distilling ethanol.

It could not have been expected in the face of the high attrition in molecular weight of the polyamide used that the precipitation procedure is independent of the temperature programming across the wide range of molecular weight attrition.

Surprisingly, furthermore, the phosphoric acid when added to the polyamide suspension is uniformly absorbed by all the preformed polyamide grains, whereby no surface defects or running problems are noted when this highly viscous powder is used in coating.

Lastly, it could not have been expected either that powders would be obtained which provide problem-free coatings. On the contrary, one had to expect that especially in the case of rapid precipitation and rapid growth of grains, more solvent would be incorporated into the grains and that the porosity of these grains would degrade the coating quality.

Accordingly, the process of the present invention selectively permits the preparation of both fluidized bed and electrostatic powders. These precipitated powders exhibit excellent properties when used in coating difficult metal parts as regards elasticity and edge coating, also the coatings are resistant to aqueous alkaline solutions. The mechanical strength is high compared to that of a powder prepared by grinding.

The precipitation also can be carried out in the presence of pigments such as titanium dioxide, lampblack, $BaSO_4$, ZnS, cadmium red, iron oxide or stabilizers such as 4-hydroxy-3,5-ditert.-butylphenol propionic acid, 4-hydroxy-3,5-di-tert.-butylphenol propionic acid, hexamethylenediamine bisamide-propionic acid esters having an aliphatic alcohol with 1 to 18 carbon atoms, trisalkylphenyl, trisalkyl-, trisacryl- or mixed esters of phosphoric acid of which the alkyl group contains 1 to 16 carbon atoms and is branched or straight-chain, or is in the presence of surfactants.

SPECIFIC EXAMPLES

EXAMPLE 1

400 kg of polyamide 12 prepared in uncontrolled manner with an end group ratio of ($-NH_2$) ($-COOH$)=45 : 55, having an extract content of 0.5% by weight and having a relative solution viscosity of 1.85 are heated together with 2,500 liters of ethanol (denatured with methylethylketone) having a water content of 1% by weight in a 3 cubic meter reactor (diameter: 1,600 mm) with agitation and a heating rate of 30° C./hour to 154° C. and kept at this temperature for 60 minutes. Then the jacket temperature is set at 124° C. and the solution is cooled at an agitator angular speed of 50 rpm in a paddle mixer with a diameter of 800 mm by distilling the ethanol into an external receiver at an average rate of 20° C./hour. At an inside temperature of 125° C., the jacket temperature is regulated not to drop by more than 3° C. below the inside temperature.

Precipitation begins at the inside temperature of 109° C. which can be observed by a rise in the inside temperature. At the onset of this precipitation stage, the agitator speed is raised to 70 rpm and the distillation output is raised until the inside temperature remains at 109+/−0.3° C. until the end of precipitation which is noted by a strong drop of the inside temperature. The precipitation lasts 20 minutes (the amount of distilled ethanol being a total of 650 liters). Thereupon distillation is shut down and the suspension so obtained is cooled by means of the reactor jacket to 45° C. and 2.82 kg of 85% phosphoric acid are stirred into the suspension. The suspension is dried in a paddle drier down to a residual moisture of 0.15% by weight.

The grain size distribution measured by the image analyzer shows the following:

| Size - Microns | % by Weight |
| --- | --- |
| <40 | 0.2 |
| <80 | 18 |
| <120 | 76 |
| <160 | 98 |
| <200 | 100 |

The powders are used to coat 3 mm thick sheetmetal sheets previously heated to 270° C. in a circulating air oven in the form of fluidized bed coatings. The nature of the molecular weight when coating is good (0.13 $\eta_{rel}$ units). The edge coating is outstanding.

EXAMPLES 2 and 3

The procedure is as in Example 1 except that the heating rate is lowered (Example 2) and the temperature of dissolution is raised (Example 3). No relation of the attrition of molecular weight to these parameters is found.

EXAMPLE 4

Again the procedure is the same as in Example 1 with the exception of the cooling rate being set at 10° C./hour. In order to match the grain size distribution of Example 1, the agitator speed is kept at 35 rpm. The time of precipitation lasts 110 minutes at 113° C.

Comparison Examples 1 to 3

The procedure is similar to that for Examples 1 through 3 but a polyamide granulate is used which already contains 0.6% by weight of phosphoric acid. There is a strong dependency of the attrition in molecular weight on the chosen parameters. This relation is reflected in a degradation of the surface quality.

The table shows the test results from the Examples and from the Comparison Examples.

Table follows on the next page.

TABLE

| | Initial Polyamide | | Heating Rate (°C./h) | Dissolution temperature (°C.) | Dissolution Time (min) | Agitator rpm in cooling Stage (rpm) | Cooling Rate (°C./h) | Precipitation | | $H_3PO_4$ addition after precipitation % by weight | Powder | Coating | |
| --- | --- | --- | --- | --- | --- | --- | --- | --- | --- | --- | --- | --- | --- |
| | $\eta$rel | $H_3PO_4$ content % by weight | | | | | | Time (min) | Temperature (°C.) | | $\eta$rel | $\eta$rel | Edge Covering |
| Example | | | | | | | | | | | | | |
| 1 | 1.85 | — | 30 | 145 | 60 | 50 | 20 | 20 | 109 | 0.6 | 1.72 | 1.85 | very good |
| 2 | 1.85 | — | 10 | 145 | 60 | 50 | 20 | 20 | 109 | 0.6 | 1.72 | 1.85 | very good |
| 3 | 1.85 | — | 30 | 155 | 60 | 50 | 20 | 20 | 109 | 0.6 | 1.72 | 1.85 | very good |
| 4 | 1.85 | — | 30 | 145 | 60 | 35 | 10 | 110 | 113 | 0.6 | 1.72 | 1.85 | very good |
| Comparison Ex. | | | | | | | | | | | | | |
| 1 | 1.85 | 0.6 | 30 | 145 | 60 | 50 | 20 | 22 | 110 | — | 1.68 | 1.86 | relatively poor |
| 2 | 1.85 | 0.6 | 10 | 145 | 60 | 50 | 20 | 20 | 109 | — | 1.65 | 1.74 | poor |
| 3 | 1.85 | 0.6 | 30 | 155 | 60 | 50 | 20 | 18 | 109 | — | 1.60 | 1.69 | poor |

What we claim is:

1. In the method of producing polyamide powder from polyamide produced in the absence of a molecular weight regulator having a relative viscosity of 1.7 to 2.0 as measured in 0.5% meta-cresol solution at 25° C. and at least 70% of said polyamide consisting of polyamide with at least ten aliphatically bound carbon atoms per carbonamide group, comprising:
   (a) dissolving said polyamide in at least twice the amount by weight of ethanol in a closed vessel at a temperature between about 130° to 150° C. to form a solution of said polyamide;
   (b) cooling said solution to a precipitation temperature between about 100° and 125° C.;
   (c) precipitating said polyamide powder from said cooled solution of (b) with agitation and under an inert gas atmosphere; and
   (d) separating said precipitated polyamide powder of (c) from said ethanol,
the improvement comprising:
   (e) rapidly cooling said solution of about 130° to 150° C. to a saturation limit of about 125° C. inside temperature with stirring and distillation of said ethanol under its own pressure;
   (f) further cooling said solution below said saturation limit with distillation of said ethanol and cooling with a jacket wherein the jacket temperature is at most 3° C. below said inside temperature up until a precipitation temperature within the range 90° to 113° is reached; and
   (g) maintaining said solution in the isothermal state during the ensuing precipitation stage by further distillation of ethanol,
the further improvement comprising:
   (h) said polyamide containing not more than 0.2% by weight of phosphoric acid; and
   (i) adding 0.3 to 1.2% by weight of phosphoric acid referred to the weight of said polyamide after step (a).

2. The method of claim 1, wherein said 0.3 to 1.2% by weight of phosphoric acid is added before step (c).

3. The method of claim 1, wherein said 0.3 to 1.2% by weight of phosphoric acid is added after step (c).

4. The method of claim 1, wherein said polyamide in step (a) is free of phosphoric acid, said polyamide has amino and carboxyl end groups, and the ratio of said amino end groups to sid carboxyl end groups is between 40:60 and 60:40.

5. The method of claim 2, wherein 0.4 to 1.0% by weight of said phosphoric acid is added before Step (c).

6. The method of claim 7, wherein 0.4 to 1.0% by weight of said phosphoric acid is added after Step (c).

7. In a method for preparing a pulverulent coating composition for high molecular weight post condensation from polyamide produced in the absence of a molecular weight regulator having a relative solution viscosity between 1.7 and 2.0 as measured in 0.5% m-cresol solution at 25° C. and containing not more than 0.2% by weight of phosphoric acid, said polyamide having at least ten aliphatically bound carbon atoms per carbonamide group or a mixture of homopolyamides and copolyamides containing at least 70% of said polyamide, comprising:
   (a) dissolving said polyamide in a solvent at an elevated temperature;
   (b) cooling said solution to a precipitation temperature;
   (c) precipitating a polyamide powder from said cooled solution; and
   (d) separating a precipitated polyamide powder, the improvement comprising;
   (e) adding 0.3 to 1.2% by weight of phosphoric acid referred to the weight of said polyamide after Step (a).

8. The method of claim 7, wherein said 0.3 to 1.2% by weight of phosphoric acid is added before Step (c).

9. The method of claim 7, wherein said 0.3 to 1.2% by weight of phosphoric acid is added after Step (c).

10. The method of claim 7, wherein said polyamide is free of phosphoric acid, said polyamide has amino and carboxyl end groups, and the ratio of said amino end groups to said carboxyl end groups is between 40:60 and 60:40.

11. The method of claim 8, wherein 0.4 to 1.0% by weight of said phosphoric acid is added before Step (c).

12. The method of claim 9, wherein 0.4 to 1.0% by weight of said phosphoric acid is added after Step (c).

* * * * *